(12) United States Patent
Matsumoto et al.

(10) Patent No.: US 8,212,181 B2
(45) Date of Patent: Jul. 3, 2012

(54) WELDING GUN DRIVING DEVICE

(75) Inventors: Koichi Matsumoto, Tochigi (JP); Hiroshi Miwa, Tochigi (JP); Teruaki Kobayashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 553 days.

(21) Appl. No.: 12/535,866

(22) Filed: Aug. 5, 2009

(65) Prior Publication Data

US 2010/0032419 A1 Feb. 11, 2010

(30) Foreign Application Priority Data

| Aug. 8, 2008 | (JP) | 2008-205623 |
| Aug. 8, 2008 | (JP) | 2008-205624 |
| Aug. 8, 2008 | (JP) | 2008-205625 |

(51) Int. Cl.
*B23K 9/00* (2006.01)
*B23K 9/10* (2006.01)
*B23K 9/28* (2006.01)
*B23K 9/32* (2006.01)
*B23K 9/12* (2006.01)

(52) U.S. Cl. .............. 219/136; 219/137.31; 219/137.44; 219/137.61; 219/137.63; 219/137.7; 219/145.1

(58) Field of Classification Search .................. 219/136, 219/137.31, 137.44, 137.61, 137.63, 137.7, 219/145.1
See application file for complete search history.

(56) References Cited

U.S. PATENT DOCUMENTS

| 3,775,584 A | * | 11/1973 | Moerke | 219/137.63 |
| 4,072,828 A | * | 2/1978 | Thome | 219/137.31 |
| 4,864,099 A | * | 9/1989 | Cusick et al. | 219/137.31 |
| 5,099,161 A |   | 3/1992 | Wolfbauer, III | |
| 5,491,321 A | * | 2/1996 | Stuart et al. | 219/137.61 |
| 6,525,297 B2 | * | 2/2003 | Doherty | 219/137.31 |
| 7,067,768 B2 | * | 6/2006 | Miwa et al. | 219/137.31 |

FOREIGN PATENT DOCUMENTS

| CH | 555614 | 10/1974 |
| DE | 2650953 | 5/1977 |
| DE | 2910725 | 10/1980 |
| FR | 2585976 A1 | 2/1987 |
| JP | 2001-150147 | 6/2001 |

* cited by examiner

Primary Examiner — Trong Phan
(74) Attorney, Agent, or Firm — Rankin, Hill & Clark LLP

(57) ABSTRACT

A welding gun driving device is provided with an electric motor, a feed screw mechanism, and a pressure rod axially moved forward and backward via the feed screw mechanism by the electric motor. A rotor of the electric motor is formed into a hollow shape through which the pressure rod is insertable. The feed screw mechanism is provided with a screw shaft fixed to the rotor concentrically with the rotor, and a nut portion screwed to the screw shaft. The pressure rod is provided with the nut portion and a hollow rod portion extending toward the axial front from the nut portion. The rotor is provided, at its inner peripheral face, with a guide portion through which the pressure rod is inserted and supported so as to be relatively rotatable and axially slidable.

5 Claims, 6 Drawing Sheets

WELDING GUN DRIVING DEVICE

BACKGROUND OF THE INVENTION

1. Field of the Invention

The present invention relates to a welding gun driving device including a pressure rod axially moved forward and backward via a feed screw mechanism by an electric motor.

2. Background Art

Conventionally, as a drive device of this type, there has been known a device in which a rotor of an electric motor is formed into a hollow shape through which a pressure rod is insertable, in which a feed screw mechanism is formed by: a screw shaft fixed to the rotor concentrically with this rotor; and a nut portion screwed to the screw shaft, and in which the pressure rod is formed by: the nut portion; and a hollow rod portion extending from the nut portion to the axial front (see Patent Document 1, for example). The turning of the pressure rod is prevented, and therefore, the turning of the nut portion is also prevented, thereby allowing the pressure rod to be axially moved forward and backward via the nut portion due to the rotation of the screw shaft. It should be noted that, in this device, a guide sleeve, having a flange portion fixed to an outer face of a front end portion of a motor housing for the electric motor, is inserted into the rotor with a clearance existing therein, and the pressure rod is axially slidably inserted and supported through this guide sleeve. [Patent Document 1] JP-A-2001-150147

Further, it should be noted that in the case of an X-type welding gun, a pressure rod is connected to a gun arm, and the gun arm is closed due to the movement of the pressure rod toward the axial front, thereby pressurizing a work. On the other hand, in the case of a C-type welding gun, a movable electrode tip is connected to a pressure rod, and the movable electrode tip abuts against a work due to the movement of the pressure rod toward the axial front, thereby pressurizing the work.

In the conventional example (JP-A-2001-150147), a front end portion of the rotor is pivotally supported by a bearing placed on an inner periphery of the front end portion of the motor housing. In this example, in order to ensure the supporting rigidity for the motor, the thickness of the front end portion of the rotor supported by the bearing cannot be drastically reduced. Furthermore, since the guide sleeve is provided with the clearance existing at the inner periphery of the rotor, the inner diameter of the guide sleeve is forced to be reduced. As a result, the outer diameter of the pressure rod, inserted and supported through the guide sleeve, is also reduced, and the buckling strength of the pressure rod is likely to be deficient. Moreover, if the outer diameter of the pressure rod is increased so as to obtain a sufficient buckling strength thereof, the electric motor is increased in size with a large diameter.

Further, in the device of the above-described conventional example (JP-A-2001-150147) includes a guide portion through which the pressure rod is axially slidably inserted and supported. Furthermore, the pressure rod is formed to have an equal diameter along its entire length, and the pressure rod is supported by the guide portion along the length corresponding to the axial length of the guide portion.

In this device, it is desired that the axial length of the guide portion be set to a sufficient length so as to obtain the supporting rigidity required for the pressure rod during a high load period when the pressure rod is moved to an axial front stroke end position to pressurize a work. However, in the above-described example, the length of the guide portion for supporting the pressure rod does not change even during a low load period when the pressure rod is retracted to the axial rear, and if the axial length of the guide portion is increased, the sliding resistance of the pressure rod against the guide portion is increased, thereby increasing energy loss.

Further, in order to smoothly operate the drive device, an outer peripheral face of the screw shaft needs to be lubricated with a lubricant. However, in the above-described conventional example (JP-A-2001-150147), the screw shaft is covered by the rotor and the pressure rod, and a lubricant cannot be supplied to the outer peripheral face of the screw shaft from outside. Therefore, the drive device has to be regularly disassembled to supply a lubricant to the outer peripheral face of the screw shaft, and a welding gun cannot be used during this time period, thus causing a decrease in the rate of operation of the welding gun.

SUMMARY OF THE INVENTION

One or more embodiments of the invention provide a welding gun driving device in which an outer diameter of a pressure rod is increased without an increase in the size of an electric motor, thereby enabling an improvement in buckling strength of the pressure rod.

In addition, one or more embodiments of the invention provide a welding gun driving device capable of obtaining a sufficient supporting rigidity for the pressure rod during a high load period when the pressure rod is moved to an axial front stroke end position, and also capable of reducing energy loss when the pressure rod is retracted to a rear side in the axial direction.

Moreover, one or more embodiments of the invention provide a welding gun driving device in which a lubricant can be supplied to an outer peripheral face of the screw shaft without disassemble of the device.

In accordance with one or more embodiments of the invention, a welding gun driving device is provided with: an electric motor; a feed screw mechanism; and a pressure rod axially moved forward and backward via the feed screw mechanism by the electric motor, wherein a turning of the pressure rod is prevented. A rotor of the electric motor is formed into a hollow shape through which the pressure rod is insertable. The feed screw mechanism comprises: a screw shaft fixed to the rotor concentrically with the rotor; and a nut portion screwed to the screw shaft. The pressure rod comprises: the nut portion; and a hollow rod portion extending toward an axial front from the nut portion. The rotor is provided, at its inner peripheral face, with a guide portion through which the pressure rod is inserted and supported so as to be relatively rotatable and axially slidable.

According to the above structure, since the pressure rod is inserted and supported through the guide portion provided at the inner peripheral face of the rotor, no radial clearance has to be provided between the rotor and the guide sleeve, serving as the guide portion, unlike the above-described conventional example. Accordingly, the inner diameter of the guide portion can be increased to the extent possible. As a result, the outer diameter of the pressure rod is increased to enable an improvement in buckling strength thereof without an increase in the size of the electric motor.

Further, since the turning of the pressure rod is prevented, the turning of the nut portion is also prevented. Accordingly, the pressure rod is moved forward and backward via the nut portion due to the rotation of the screw shaft. Further, the guide portion is relatively rotatable with respect to the pressure rod, the turning of which is prevented, and the rotor is rotated without any trouble even if the guide portion is fixed to the rotor.

At an inner peripheral face of a portion of the rotor located in a predetermined axial range including a front end portion of the rotor pivotally supported by a bearing placed on an inner periphery of a front end portion of a motor housing for the electric motor, a guide sleeve through which the pressure rod is inserted and supported so as to be relatively rotatable and axially slidable may be fixed. The guide portion may be formed by this guide sleeve.

According to the above structure, even if the front end portion of the rotor, pivotally supported by the bearing, is relatively thinly formed, the front end portion of the rotor is reinforced by the guide sleeve fixed at the inner peripheral face of the rotor, and therefore, the supporting rigidity for the rotor is ensured. Moreover, there is no need to provide any radial clearance between the guide sleeve and the rotor; therefore, combined with the thinning of the front end portion of the rotor, the inner diameter of the guide sleeve can be increased to the extent possible. As a result, the outer diameter of the pressure rod is increased to enable an improvement in buckling strength thereof without an increase in the size of the electric motor.

Moreover, in accordance with one or more embodiments of the invention, a welding gun driving device is provided with: an electric motor; a feed screw mechanism; a pressure rod axially moved forward and backward via the feed screw mechanism by the electric motor, and a guide portion through which the pressure rod is axially slidably inserted and supported. A rotor of the electric motor is formed into a hollow shape through which the pressure rod is insertable. The feed screw mechanism comprises: a screw shaft fixed to the rotor concentrically with this rotor; and a nut portion screwed to the screw shaft. The pressure rod comprises: the nut portion; and a hollow rod portion extending toward an axial front from the nut portion. The pressure rod is formed into a stepped shape having: a large diameter portion; and a small diameter portion located toward the axial front with respect to the large diameter portion. The guide portion comprises: a first guide portion through which the large diameter portion of the pressure rod is inserted and supported; and a second guide portion through which the small diameter portion of the pressure rod is inserted and supported. An axial length of the first guide portion is set such that, when the pressure rod is retracted to a rear side of the axial direction, at least a part of the large diameter portion of the pressure rod gets out of the first guide portion toward the rear side of the axial direction.

According to the above structure, during a high load period when the pressure rod is moved to an axial front stroke end position, the pressure rod can be supported at a wide area by both of the first and second guide portions, and a sufficient supporting rigidity for the pressure rod can be obtained. On the other hand when the pressure rod is retracted to the axial rear, at least part of the large diameter portion of the pressure rod gets out of the first guide portion toward the axial rear, and the supporting area for the large diameter portion provided by the first guide portion is decreased. Therefore, the sliding resistance of the pressure rod against the first guide portion is decreased, thereby reducing energy loss when the pressure rod is retracted.

In addition, even if the large diameter portion gets out of the first guide portion when the pressure rod is retracted, the small diameter portion of the pressure rod is supported by the second guide portion, thus preventing impairment of the stability for supporting the pressure rod.

Furthermore, in accordance with one or more embodiments of the invention, a welding gun driving device is provided with: an electric motor; a feed screw mechanism; a pressure rod axially moved forward and backward via the feed screw mechanism by the electric motor. A rotor of the electric motor is formed into a hollow shape through which the pressure rod is insertable. The feed screw mechanism comprises: a screw shaft fixed to the rotor concentrically with this rotor; and a nut portion provided at a rear end portion of the pressure rod, and screwed to the screw shaft. The screw shaft comprises: an axial hole opened to a front end face of the screw shaft and extended in an axial direction of the screw shaft; and a radial hole communicated with the axial hole and opened to an outer peripheral face of the screw shaft. The pressure rod comprises: a lubricant injection port opened to an outer peripheral face of the pressure rod; and a lubricant communication port communicated with this injection port and opposed to a front end of the axial hole of the screw shaft. When the pressure rod is retracted to an axial rear stroke end position, the lubricant communication port is connected to the front end of the axial hole of the screw shaft.

According to the above structure, upon retraction of the pressure rod to the axial rear stroke end position, the lubricant communication port is connected to the front end of the axial hole of the screw shaft. In this state, upon injection of a lubricant from the lubricant injection port opened to the outer peripheral face of the pressure rod, the lubricant is supplied to the outer peripheral face of the screw shaft via the lubricant communication port, the axial hole and the radial hole. Accordingly, it is possible to supply the lubricant to the outer peripheral face of the screw shaft without disassembling the drive device, thus improving the rate of operation of a welding gun.

Further, the radial hole of the screw shaft may be formed in a region to which the nut portion is screwed, with the pressure rod retracted to the axial rear stroke end position. Thus, the lubricant can also be supplied to the nut portion directly.

Other aspects and advantages of the invention will be apparent from the following description, the drawings and the claims.

DETAILED DESCRIPTION OF THE EXEMPLARY EMBODIMENTS

First Exemplary Embodiment

Figure 1:
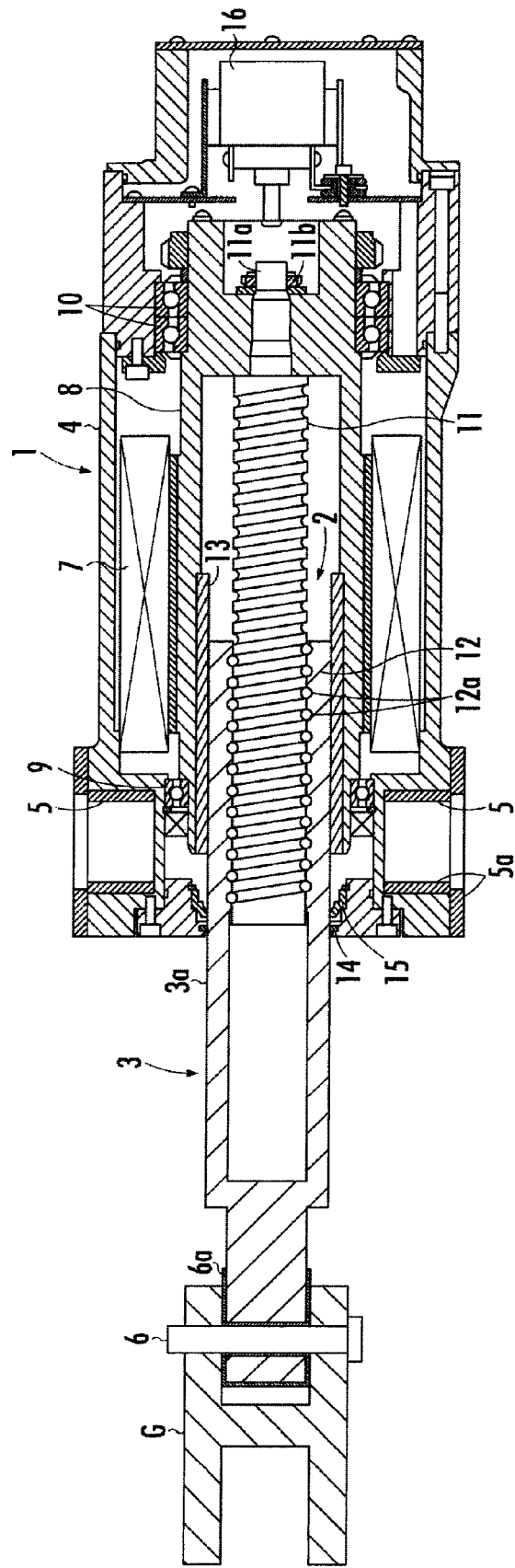
FIG. 1 is a cross-sectional view showing a welding gun driving device according to a first embodiment of the present invention.

FIG. 1 shows a welding gun driving device according to a first embodiment (first exemplary embodiment) of the present invention. This drive device includes: a pressure rod 3 axially moved forward and backward via a feed screw mechanism 2 by an electric motor 1 consisting of a servomotor or the like. Further, the electric motor 1 is connected to one of gun arms (which is not shown) of an X-type welding gun via a pin inserted into concave holes 5 formed at both lateral faces of a front end portion of a motor housing 4, and a front end portion of the pressure rod 3 is connected to the other gun arm G of the welding gun via a pin 6. In this diagram, the reference characters "5a" and "6a" each denote an insulating member.

The electric motor 1 includes: a stator coil 7 fixed to an inner face of the motor housing 4; and a rotor 8. The rotor 8 is pivotally supported within the motor housing 4 via a bearing 9 placed on an inner periphery of the front end portion of the motor housing 4, and via a bearing 10 placed on an inner periphery of a rear end portion of the motor housing 4. Further, the rotor 8 is formed into a hollow shape through which the pressure rod 3 is insertable.

The feed screw mechanism 2 includes: a screw shaft 11 fixed to the rotor 8 concentrically with this rotor 8; and a nut portion 12 screwed to the screw shaft 11 via a plurality of balls 12a. Furthermore, the pressure rod 3 includes: the nut portion 12; and a hollow rod portion 3a extending toward the axial front from the nut portion 12. In the first embodiment, since the turning of the pressure rod 3 is prevented by the gun arm G, the turning of the nut portion 12 is also prevented. Accordingly, upon rotation of the screw shaft 11 in combination with the rotor 8, the pressure rod 3 is axially moved forward/backward via the nut portion 12, and the gun arm G is opened/closed.

It should be noted that the screw shaft 11 is fitted, in a noncircular cross-sectional shaft portion 11a at its rear end, to a closed end at the rear end of the rotor 8, and is fastened to the rotor 8 by a nut 11b.

Furthermore, at the inner peripheral face of a portion of the rotor 8 located in a predetermined axial range including the front end portion of the rotor 8 pivotally supported by the bearing 9 placed on the inner periphery of the front end portion of the motor housing 4, there is fixed a guide sleeve 13 serving as a guide portion through which the pressure rod 3 is inserted and supported so as to be relatively rotatable and axially slidable.

Thus, even if the front end portion of the rotor 8, pivotally supported by the bearing 9, is relatively thinly formed, the front end portion of the rotor 8 is reinforced by the guide sleeve 13 fixed at the inner peripheral face of the rotor 8, and therefore, the supporting rigidity for the rotor 8 is ensured. Moreover, unlikely to the above-described conventional example, there is no need to provide any radial clearance between the guide sleeve 13 and the rotor 8; therefore, combined with the thinning of the front end portion of the rotor 8, the inner diameter of the guide sleeve 13 can be increased to the extent possible. As a result, the diameter of the pressure rod 3, inserted and supported through the guide sleeve 13, is increased to enable an improvement in buckling strength of the pressure rod 3 without an increase in the size of the electric motor 1.

It should be noted that the guide sleeve 13 is relatively rotatable with respect to the pressure rod 3, and the rotor 8 is rotated without any trouble even if the guide sleeve 13 is fixed to the rotor 8. Further, the inner diameter of a portion of the rotor, located more rearward than the guide sleeve 13, is smaller than the outer diameter of the guide sleeve 13 but greater than the inner diameter thereof, thus preventing the pressure rod 3 from being brought into contact with the inner peripheral face of the rotor portion located more rearward than the guide sleeve 13.

Furthermore, a dust seal 14 for preventing intrusion of foreign matter and an oil scraper 15 are placed on the inner periphery of the motor housing 4 at the most front end thereof. Besides, inside the rear end portion of the motor housing 4, there is provided an encoder 16 for detecting the rotation angle of the rotor 8.

Although the first embodiment of the present invention has been described thus far with reference to the drawing, the present invention is not limited to the first embodiment. For example, in the first embodiment, the guide portion, through which the pressure rod 3 is axially slidably inserted and supported, is formed by the guide sleeve 13 fixed at the inner peripheral face of the rotor 8; however, a coating layer having lubricity may be formed at the inner peripheral face of the rotor 8, and the guide portion may be formed by this coating layer.

Furthermore, in the first embodiment, the present invention is applied to an X-type welding gun driving device, but the present invention may also be applied to a C-type welding gun driving device. In such a case, a movable electrode tip is connected to a pressure rod, and the turning of the pressure rod cannot be prevented as it is. Therefore, there is provided a guide bar parallelly connected to the pressure rod, and the guide bar is inserted through a guide fixed to a motor housing, thereby preventing the turning of the pressure rod.

Second Exemplary Embodiment

Figure 2:
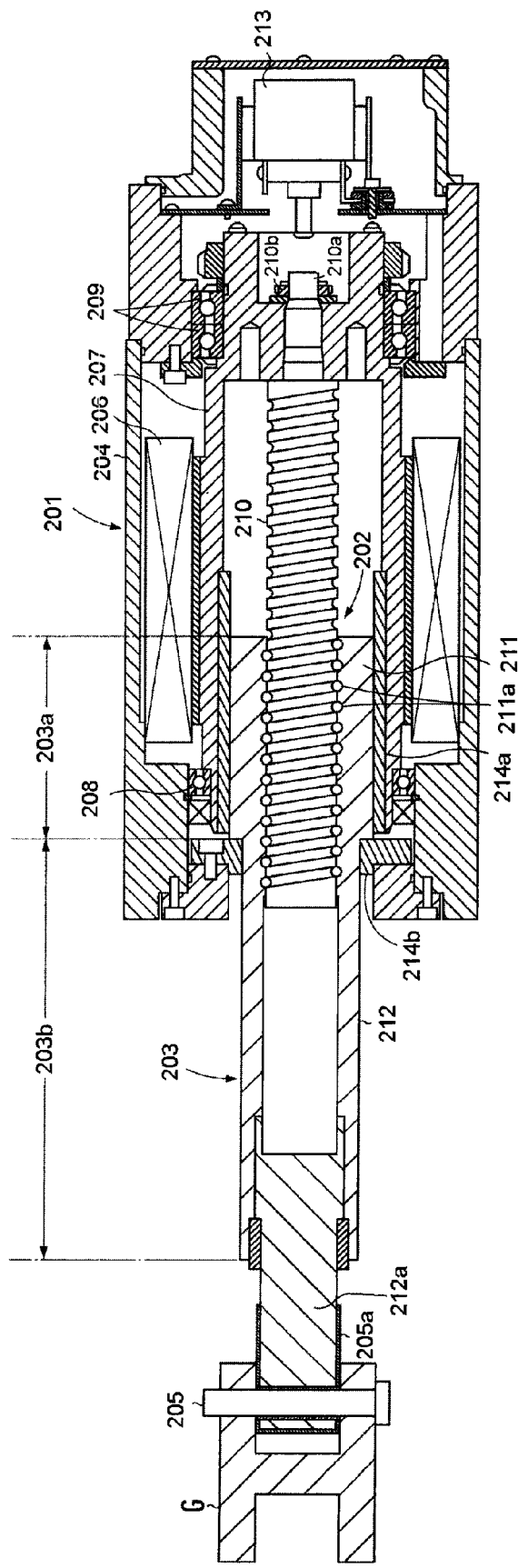
FIG. 2 is a cross-sectional view showing a welding gun driving device according to a second embodiment of the present invention.

FIG. 2 shows a welding gun driving device according to a second embodiment (Second Exemplary Embodiment) of the present invention. This drive device includes: a pressure rod 203 axially moved forward and backward via a feed screw mechanism 202 by an electric motor 201 consisting of a servomotor or the like. Further, the electric motor 201 is connected, in a motor housing 204, to one of gun arms (which is not shown) of an X-type welding gun, and a front end portion of the pressure rod 203 is connected to the other gun arm G of the welding gun via a pin 205. In this diagram, the reference character "205a" denotes an insulating member.

The electric motor 1 includes: a stator coil 206 fixed to an inner face of the motor housing 204; and a rotor 207. The rotor 207 is pivotally supported within the motor housing 204 via a bearing 208 placed on an inner periphery of a front end portion of the motor housing 204, and via a bearing 209 placed on an inner periphery of a rear end portion of the motor housing 204. Further, the rotor 207 is formed into a hollow shape through which the pressure rod 203 is insertable.

The feed screw mechanism 202 includes: a screw shaft 210 fixed to the rotor 207 concentrically with this rotor 207; and a nut portion 211 screwed to the screw shaft 210 via balls 211a. Moreover, the pressure rod 203 includes: the nut portion 211; and a hollow rod portion 212 extending toward the axial front from the nut portion 211. At a front end of the hollow rod portion 212, a connecting rod 212a for the gun arm G is attached. In the second embodiment, since the turning of the pressure rod 203 is prevented by the gun arm G, the turning of the nut portion 211 is also prevented. Accordingly, upon rotation of the screw shaft 210 in combination with the rotor 207, the pressure rod 203 is axially moved forward/backward via the nut portion 211. Furthermore, upon movement of the pressure rod 203 to an axial front stroke end position (i.e., the position shown in FIG. 2), the gun arm G is closed to pressurize a work.

It should be noted that the screw shaft 210 is fitted, in a noncircular cross-sectional shaft portion 210a at its rear end, to a closed end at a rear end of the rotor 207, and is fastened to the rotor 207 by a nut 210b. Besides, inside the rear end portion of the motor housing 204, there is provided an encoder 213 for detecting the rotation angle of the rotor 207.

In the second embodiment, the pressure rod 203 is formed into a stepped shape having: a large diameter portion 203a; and a small diameter portion 203b located toward the axial front with respect to the large diameter portion 203a. It should be noted that in the second embodiment, the large diameter portion 203a is defined to range from a rear end of the nut portion 211 to a position somewhere along the nut portion 211, while the small diameter portion 203b is defined to include a front-end-side portion of the nut portion 211 and the hollow rod portion 212.

At an inner peripheral face of a front-end-side half portion of the rotor 207, there is fixed a tubular first guide portion 214a through which the large diameter portion 203a of the pressure rod 203 is axially slidably inserted and supported. On the other hand, at an inner periphery of the front end portion of the motor housing 204, there is fixed a ring-shaped second guide portion 214b through which the small diameter portion 203b of the pressure rod 203 is axially slidably inserted and supported.

Figure 3:
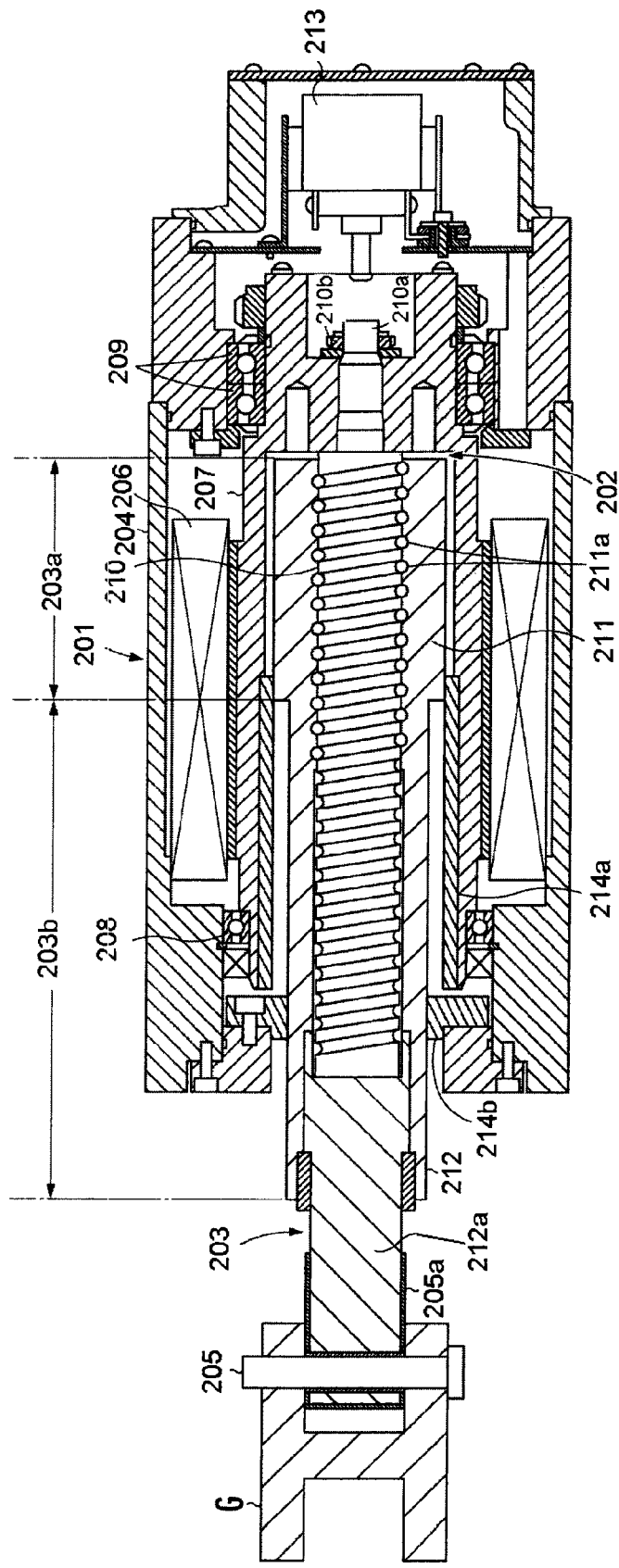
FIG. 3 is a cross-sectional view showing a state in which a pressure rod of the welding gun driving device according to the second embodiment is retracted.

The axial length of the first guide portion 214a is set such that, when the pressure rod 203 is retracted to the axial rear, at least part of the large diameter portion 203a of the pressure rod 203 gets out of the first guide portion 214a toward the axial rear. Then, when the pressure rod 203 has reached an axial rear stroke end position (i.e., the position shown in FIG. 3), most part of the large diameter portion 203a gets out of the first guide portion 214a, and only a front end portion of the large diameter portion 3a remains within the first guide portion 214a.

Thus, during a high load period when the pressure rod 203 is moved to the axial front stroke end position to pressurize a work, the large diameter portion 203a of the pressure rod 203 is supported along its entire length by the first guide portion 214a. Accordingly, the pressure rod 203 can be supported at a wide area by the first guide portion 214a and the second guide portion 214a, and a sufficient supporting rigidity for the pressure rod 203 can be obtained; in addition, the durability of the first guide portion 214a and the second guide portion 214b is improved.

On the other hand, when the pressure rod 203 is retracted to the axial rear, the large diameter portion 203a of the pressure rod 203 gets out of the first guide portion 214a from its rear end side toward the axial rear, and the supporting area for the large diameter portion 203a provided by the first guide portion 214a is decreased. Therefore, the sliding resistance of the pressure rod 203 against the first guide portion 214a is decreased, thereby reducing energy loss when the pressure rod 203 is retracted. Besides, even when the pressure rod 203 is retracted to the axial rear stroke end position (i.e., the position shown in FIG. 3), the small diameter portion 203b is supported by the second guide portion 214b, and the front end portion of the large diameter portion 203a is supported by the first guide portion 214a, thus preventing impairment of the stability for supporting the pressure rod 203.

Third Exemplary Embodiment

Figure 4:
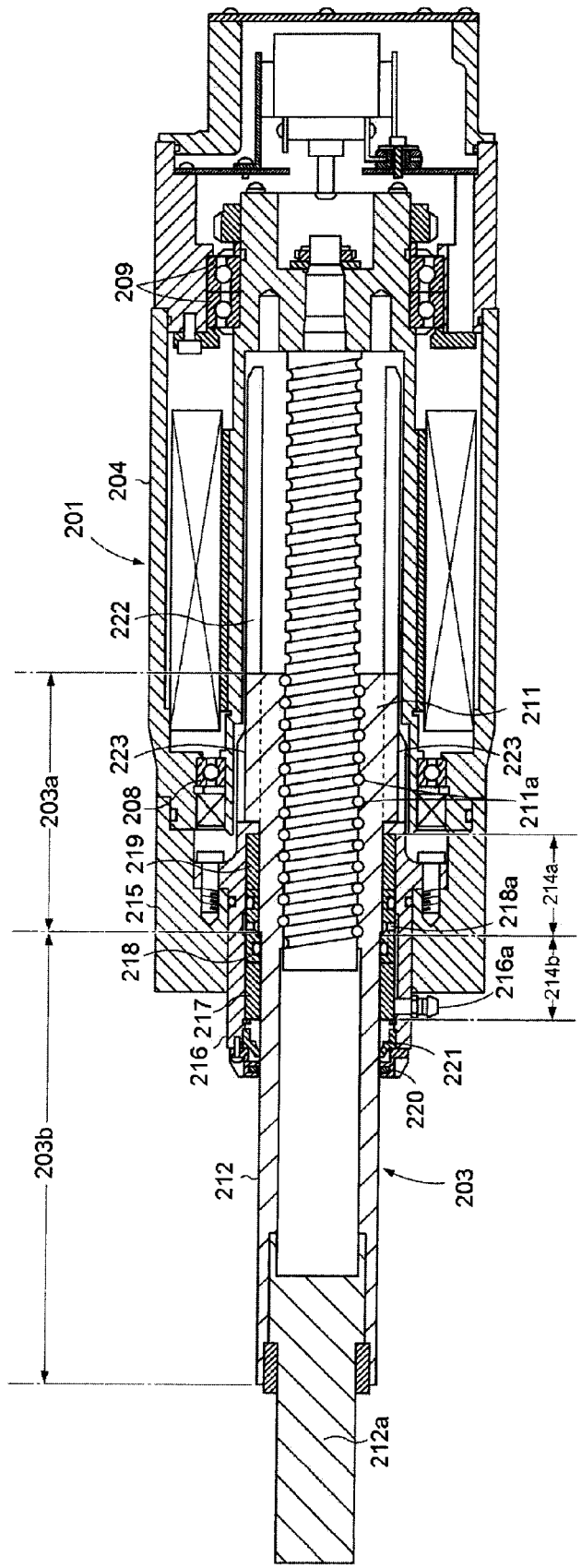
FIG. 4 is a cross-sectional view showing a welding gun driving device according to a third embodiment of the present invention.

A third embodiment (third exemplary embodiment) is described with reference to FIG. 4. A drive device according to the third embodiment is applied to a C-type welding gun. It should be noted that the same members and portions as those in the foregoing second embodiment are identified by the same reference characters.

In the third embodiment, the motor housing 204 is fixed to a gun main body 215 to which a C-shaped yoke of a C-type welding gun is attached. A tube body 216, through which the pressure rod 203 is movably inserted, is further fixed to the gun main body 215. At an inner periphery of the tube body 216, there are provided three metal bushes 217, 218 and 219 arranged axially. The inner diameter of the front-end-side first metal bush 217 and the inner diameter of a front end portion of the middle second metal bush 218 each conform to the outer diameter of the small diameter portion 203b of the pressure rod 203, and the second guide portion 214b, through which the small diameter portion 203b is axially slidably inserted and supported, is formed by the first metal bush 217 and the front end portion of the second metal bush 218. Furthermore, the inner diameter of a rear end portion of the second metal bush 218 and the inner diameter of the rear-end-side third metal bush 219 each conform to the outer diameter of the pressure rod 203, and the first guide portion 214a, through which the large diameter portion 203a is axially slidably inserted and supported, is formed by the rear end portion of the second metal bush 218 and the third metal bush 219.

In this case, according to the third embodiment, in order to reduce, to the extent possible, the energy loss when the pressure rod 203 is retracted to the axial rear, the entire large diameter portion 203a gets out of the first guide portion 214a toward the axial rear in the middle of retraction. It should be noted that in the third embodiment, the axial length of the second guide portion 214b is elongated to a certain extent; therefore, even if the entire large diameter portion 203a gets out of the first guide portion 214a in the middle of retraction, the pressure rod 203 can be stably supported by the second guide portion 214b.

It should be noted that, in the second metal bush 218, there is formed a hole 218a for introducing, to an inner peripheral face, a lubricant such as grease injected from a lubricant injection port 216a provided at the tube body 216. Moreover, the tube body 216 is provided, at an inner periphery of a front end portion thereof, with a dust seal 220 and an oil scraper 221.

Actually, in a C-type welding gun, a fixed electrode tip is attached to a front end of a C-shaped yoke, and a movable electrode tip, opposed to the fixed electrode tip, is attached to the front end of the pressure rod 203. However, the turning of the pressure rod 203 cannot be prevented as it is; therefore, in the third embodiment, a turning prevention mechanism is provided inside the rotor 207.

The turning prevention mechanism is provided by forming, in a sleeve 222 extended into the rotor 207 from the tube body 216, an axial slit for receiving an axially longitudinal convex portion 223 protrusively provided at an outer peripheral face of a rear-end-side half part of the nut portion 211. It should be noted that the inner diameter of the sleeve 222 is slightly greater than the outer diameter of the large diameter portion 203a of the pressure rod 203, and therefore, the large diameter portion 203a will not be brought into contact with the sleeve 222.

Fourth Exemplary Embodiment

Figure 5:
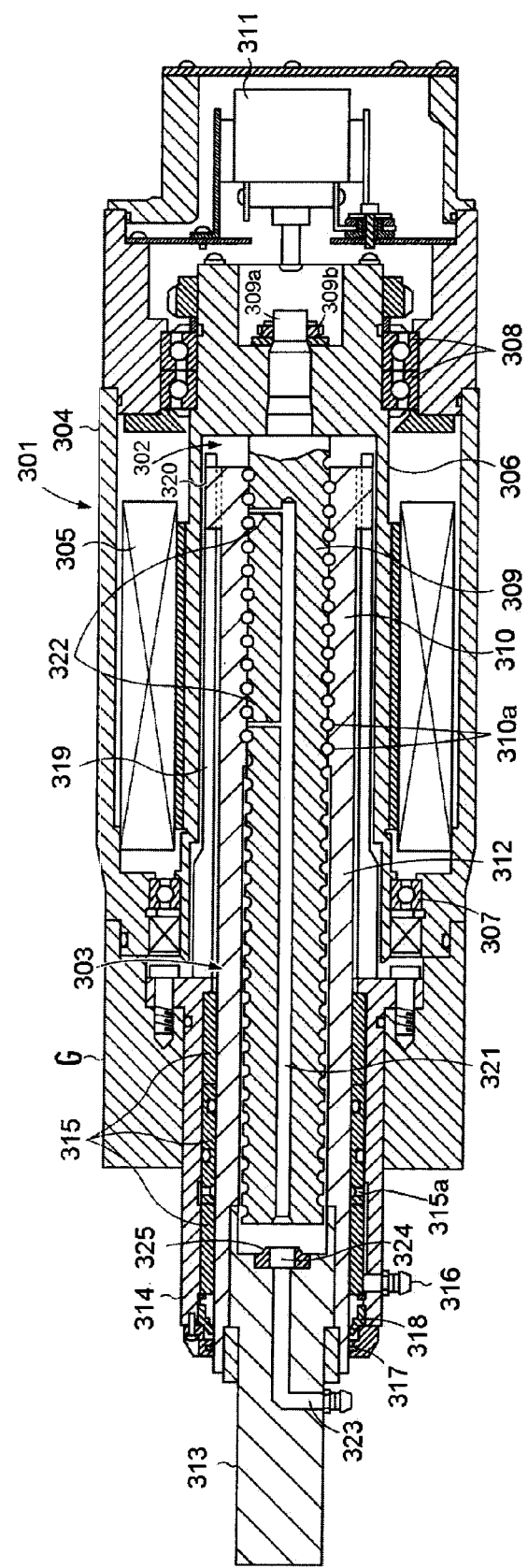
FIG. 5 is a cross-sectional view showing a welding gun driving device according to a fourth embodiment of the present invention.
Figure 6:
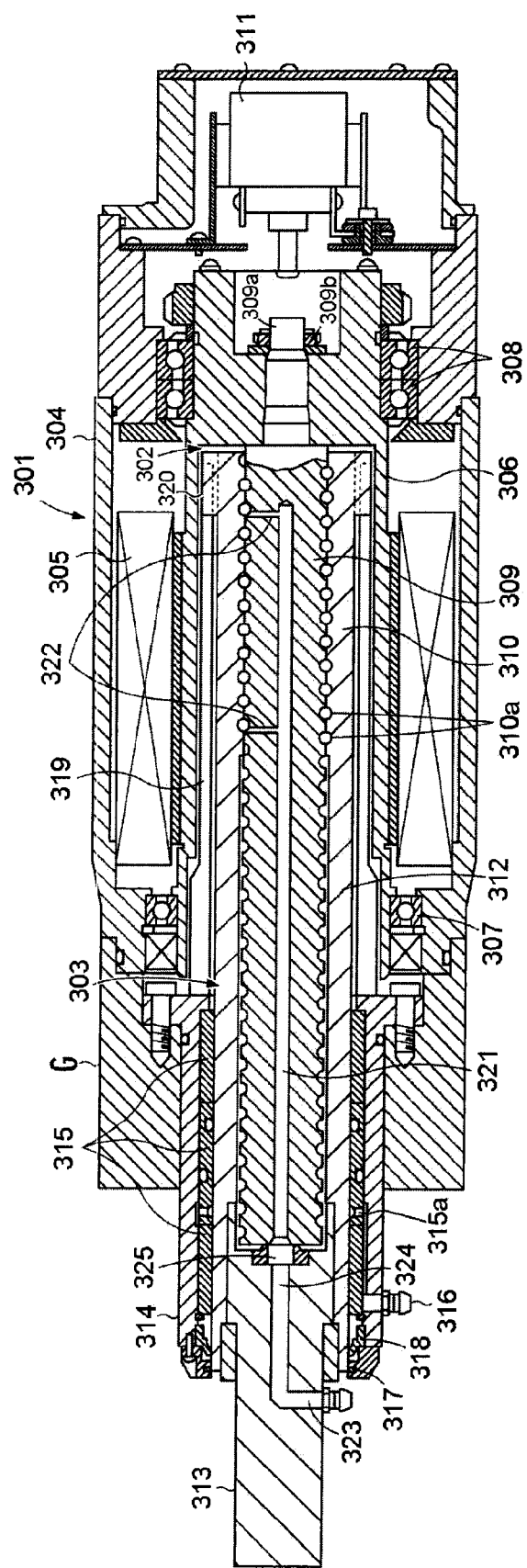
FIG. 6 is a cross-sectional view showing a state in which a pressure rod of the welding gun driving device according to the fourth embodiment is retracted to an axial rear stroke end position.

FIG. 5 and FIG. 6 each show a welding gun driving device according to a fourth embodiment (fourth exemplary embodiment) of the present invention. This drive device includes: a pressure rod 303 axially moved forward and backward via a feed screw mechanism 302 by an electric motor 301 consisting of a servomotor or the like. A motor housing 304 for the electric motor 301 is fixed to a gun main body G to which a C-shaped yoke of a C-type welding gun is attached. Further, a movable electrode tip, opposed to a fixed electrode tip attached to a front end of the C-shaped yoke, is connected to a front end of the pressure rod 303, and the pressure rod 303 is moved toward the axial front, thereby allowing a work to be sandwiched between the fixed electrode tip and the movable electrode tip.

The electric motor 301 includes: a stator coil 305 fixed to an inner face of the motor housing 304; and a rotor 306. The rotor 306 is pivotally supported within the motor housing 304 via a bearing 307 placed on an inner periphery of a front end portion of the motor housing 304, and via a bearing 308 placed on an inner periphery of a rear end portion of the motor housing 304. Further, the rotor 306 is formed into a hollow shape through which the pressure rod 303 is insertable.

The feed screw mechanism 302 includes: a screw shaft 309 fixed to the rotor 306 concentrically with this rotor 306; and a nut portion 310 provided integrally with a rear end portion of the pressure rod 303, and screwed to the screw shaft 309 via balls 310a. It should be noted that the screw shaft 309 is fitted, in a noncircular cross-sectional shaft portion 309a provided at its rear end, to a closed end at a rear end of the rotor 306, and is fastened to the rotor 306 by a nut 309b. Furthermore, inside the rear end portion of the motor housing 304, there is provided an encoder 311 for detecting the rotation angle of the rotor 306.

The pressure rod 303 includes: a hollow rod portion 312 extending toward the axial front from the nut portion 310; and a small-diameter solid rod portion 313, which is placed on a front end of the hollow rod portion 312, and to which the movable electrode tip is attached. Further, a guide sleeve 314, through which the pressure rod 303 is inserted, is fixed to the gun main body G. At an inner periphery of the guide sleeve 314, there are provided three metal bushes 315 arranged axially, and the pressure rod 303 is axially slidably inserted and supported by means of these metal bushes 315. It should be noted that, in the middle metal bush 315, there is formed a hole 315a for introducing, to an inner peripheral face, a lubricant such as grease injected from a lubricant injection port 316 provided at the guide sleeve 314. Moreover, the guide sleeve 314 is provided, at the inner periphery of a front end portion thereof, with a dust seal 317 and an oil scraper 318.

At a rear end of the guide sleeve 314, a tube portion 319 inserted into the rotor 306 is formed. Further, convex portions 320 are protrusively provided at a plurality of positions at an outer peripheral face of a rear end portion of the nut portion 310, and axial slits for receiving these convex portions 320 are formed in the tube portion 319, thereby preventing the turning of the pressure rod 303.

Furthermore, in the screw shaft 309, there are formed: an axial hole 321 opened to a front end face of the screw shaft 309 and extended in the axial direction of the screw shaft 309; and radial holes 322 communicated with the axial hole 321 and opened to an outer peripheral face of the screw shaft 309. Besides, in the solid rod portion 313 at the front end of the pressure rod 303, there are formed: a lubricant injection port 323 opened to an outer peripheral face of the solid rod portion 313; and a lubricant communication port 324 communicated with this injection port 323 and opposed to a front end of the axial hole 321 of the screw shaft 309. A lubricant supply tube, which is not shown, is connected to the lubricant injection port 323, and a ring-shaped seal member 325 is placed on a position through which the lubricant communication port 324 is opened.

Further, when the pressure rod 303 is retracted to an axial rear stroke end position (i.e., the position shown in FIG. 6), the seal member 325 abuts against the front end face of the screw shaft 309, and the lubricant communication port 324 is connected to the front end of the axial hole 321. In this state, upon injection of a lubricant such as grease from the lubricant injection port 323, the lubricant is supplied to the outer peripheral face of the screw shaft 309 via the lubricant communication port 324, the axial hole 321 and the radial holes 322. Accordingly, it is possible to supply the lubricant to the outer peripheral face of the screw shaft 9 without disassembling the drive device, thus improving the rate of operation of the welding gun.

Moreover, the radial holes 322 are formed in regions to which the nut portion 310 is screwed, with the pressure rod 303 retracted to the axial rear stroke end position. Therefore, the lubricant can also be supplied to the nut portion 310 directly.

It should be noted that when the welding gun is opened after work welding, the pressure rod 303 is normally returned to the position shown in FIG. 5, which is located more forward than the axial rear stroke end position. Accordingly, in normal times, the seal member 325 does not abut against the screw shaft 309, thereby ensuring the durability of the seal member 325.

Although the fourth embodiment in which the present invention is applied to a C-type welding gun driving device has been described thus far, the present invention is also applicable to an X-type welding gun driving device. In such a case, a front end portion of a pressure rod is connected to a gun arm of an X-type welding gun, and the gun arm is opened/closed by forward/backward motion of the pressure rod.

While description has been made in connection with specific exemplary embodiments of the invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS

G . . . gun arm, 1 . . . electric motor, 2 . . . feed screw mechanism, 3 . . . pressure rod, 3a . . . hollow rod portion, 8 . . . rotor, 9 . . . bearing, 11 screw shaft, 12 . . . nut portion, 13 . . . guide sleeve (guide portion)

201 . . . electric motor, 202 . . . feed screw mechanism, 203 . . . pressure rod, 203a . . . large diameter portion, 203b . . . small diameter portion, 207 . . . rotor, 210 . . . screw shaft, 211 . . . nut portion, 212 . . . hollow rod portion, 214a . . . first guide portion, 214b . . . second guide portion 301 . . . electric motor, 302 . . . feed screw mechanism, 303 . . . pressure rod, 306 . . . rotor, 309 . . . screw shaft, 310 . . . nut portion, 321 . . . axial hole, 322 . . . radial hole, 323 . . . lubricant injection port, 324 . . . lubricant communication port

What is claimed is:

1. A welding gun driving device comprising:
an electric motor;
a feed screw mechanism; and
a pressure rod axially moved forward and backward via the feed screw mechanism by the electric motor, wherein a turning of the pressure rod is prevented,
wherein a rotor of the electric motor is formed into a hollow shape through which the pressure rod is insertable,
wherein the feed screw mechanism comprises: a screw shaft fixed to the rotor concentrically with the rotor; and a nut portion screwed to the screw shaft,
wherein the pressure rod comprises: the nut portion; and a hollow rod portion extending toward an axial front from the nut portion, and wherein the rotor is provided, at its inner peripheral face, with a guide portion through which the pressure rod is inserted and supported so as to be relatively rotatable and axially slidable.

2. The welding gun driving device according to claim 1, wherein, at an inner peripheral face of a portion of the rotor located in a predetermined axial range including a front end portion of the rotor pivotally supported by a bearing placed on an inner periphery of a front end portion of a motor housing for the electric motor, there is fixed a guide sleeve through which the pressure rod is inserted and supported so as to be relatively rotatable and axially slidable, and the guide portion is formed by this guide sleeve.

3. A welding gun driving device comprising:
an electric motor;
a feed screw mechanism;
a pressure rod axially moved forward and backward via the feed screw mechanism by the electric motor; and
a guide portion through which the pressure rod is axially slidably inserted and supported,
wherein a rotor of the electric motor is formed into a hollow shape through which the pressure rod is insertable;
wherein the feed screw mechanism comprises: a screw shaft fixed to the rotor concentrically with this rotor; and a nut portion screwed to the screw shaft,
wherein the pressure rod comprises: the nut portion; and a hollow rod portion extending toward an axial front from the nut portion,
wherein the pressure rod is formed into a stepped shape having: a large diameter portion; and a small diameter portion located toward the axial front with respect to the large diameter portion,
wherein the guide portion comprises: a first guide portion through which the large diameter portion of the pressure rod is inserted and supported; and a second guide portion through which the small diameter portion of the pressure rod is inserted and supported, and
wherein an axial length of the first guide portion is set such that, when the pressure rod is retracted to a rear side of the axial direction, at least apart of the large diameter portion of the pressure rod gets out of the first guide portion toward the rear side of the axial direction.

4. A welding gun driving device comprising:
an electric motor;
a feed screw mechanism;
a pressure rod axially moved forward and backward via the feed screw mechanism by the electric motor,
wherein a rotor of the electric motor is formed into a hollow shape through which the pressure rod is insertable,
wherein the feed screw mechanism comprises: a screw shaft fixed to the rotor concentrically with this rotor; and a nut portion provided at a rear end portion of the pressure rod, and screwed to the screw shaft,
wherein the screw shaft comprises: an axial hole opened to a front end face of the screw shaft and extended in an axial direction of the screw shaft; and a radial hole communicated with the axial hole and opened to an outer peripheral face of the screw shaft,
wherein the pressure rod comprises: a lubricant injection port opened to an outer peripheral face of the pressure rod; and a lubricant communication port communicated with this injection port and opposed to a front end of the axial hole of the screw shaft, and
wherein when the pressure rod is retracted to an axial rear stroke end position, the lubricant communication port is connected to the front end of the axial hole of the screw shaft.

5. The welding gun driving device according to claim 4, wherein the radial hole is formed in a region to which the nut portion is screwed, with the pressure rod retracted to the stroke end position.

* * * * *